(12) United States Patent
Raj et al.

(10) Patent No.: US 12,633,291 B1
(45) Date of Patent: May 19, 2026

(54) SYSTEMS AND METHODS TO EFFECTUATE INTENTS BASED ON CONTEXT DURING UTTERANCES OF COMMANDS AND PERMITTED INTENTS

(71) Applicant: Suki AI, Inc., Redwood City, CA (US)

(72) Inventors: Priyank Raj, Los Altos, CA (US); Gaurav Trivedi, Pittsburgh, PA (US); Vamsi Reddy Chagari, Milpitas, CA (US); Mona Abdul-Azeez Sheikh, Redwood City, CA (US); Raghu P. Chalasani, San Jose, CA (US); Ajithkumar Warrier, Fremont, CA (US)

(73) Assignee: Suki AI, Inc., Redwood City, CA (US)

( * ) Notice: Subject to any disclaimer, the term of this patent is extended or adjusted under 35 U.S.C. 154(b) by 161 days.

(21) Appl. No.: 18/583,648

(22) Filed: Feb. 21, 2024

(51) Int. Cl.
| | |
|---|---|
| *G10L 15/26* | (2006.01) |
| *G06F 40/279* | (2020.01) |
| *G10L 15/06* | (2013.01) |

(52) U.S. Cl.
CPC ............ *G10L 15/26* (2013.01); *G06F 40/279* (2020.01); *G10L 15/063* (2013.01)

(58) Field of Classification Search
None
See application file for complete search history.

(56) References Cited

U.S. PATENT DOCUMENTS

| | | | | |
|---|---|---|---|---|
| 10,175,860 B2 * | 1/2019 | Marantz | ................ | G06F 3/0484 |
| 10,811,013 B1 * | 10/2020 | Secker-Walker | ... | G10L 15/1822 |
| 12,183,344 B1 * | 12/2024 | Venkataraman | .... | G10L 15/1822 |
| 2012/0166177 A1 * | 6/2012 | Beld | ....................... | G06F 40/20 |
| | | | | 704/9 |
| 2015/0228275 A1 * | 8/2015 | Watanabe | ........... | G10L 15/1822 |
| | | | | 704/275 |
| 2016/0188574 A1 * | 6/2016 | Homma | .................. | G06F 40/35 |
| | | | | 704/9 |
| 2019/0235831 A1 * | 8/2019 | Bao | ......................... | G10L 15/18 |
| 2020/0380382 A1 * | 12/2020 | Seo | ....................... | H04L 51/046 |
| 2022/0156095 A1 * | 5/2022 | Myers | ................. | H04M 7/0027 |
| 2022/0357936 A1 * | 11/2022 | Duggal | ................... | H04L 63/20 |
| 2023/0128422 A1 * | 4/2023 | Li | ........................... | G10L 15/24 |
| | | | | 345/156 |
| 2025/0238707 A1 * | 7/2025 | Schuetz | ................. | G06F 9/453 |

* cited by examiner

*Primary Examiner* — Neeraj Sharma
(74) *Attorney, Agent, or Firm* — Esplin & Associates, PC

(57) ABSTRACT

Systems and methods to effectuate intents based on context during utterances of commands and permitted intents are disclosed. Exemplary implementations may: obtain audio information that represents sounds captured by a client computing platform; generate, by performing speech recognition on the audio information, a transcript; perform natural language processing on the transcript to determine sets of entities within the commands; provide the transcript and the set of entities to the trained intent model; obtain, from the trained intent model, a set of potential permitted intents from the predefined list of permitted intents that are prospective for both a first command uttered in a first context and a second command uttered in a second context; determine the different contexts during the utterances of the commands; determine, based on the different contexts, final intents for the commands from the set of potential permitted intents; execute the final intents.

14 Claims, 5 Drawing Sheets

SYSTEMS AND METHODS TO EFFECTUATE INTENTS BASED ON CONTEXT DURING UTTERANCES OF COMMANDS AND PERMITTED INTENTS

FIELD OF THE DISCLOSURE

The present disclosure relates to systems and methods to effectuate intents based on context during utterances of commands and permitted intents.

BACKGROUND

During a caregiver-subject interaction, the caregiver and the subject may be discussing matters that require intents or result so that proper care may be provided to the subject. Each of the intents may require extensive manual user input by the caregiver during or after the caregiver-subject interaction.

SUMMARY

The system may include electronic storage, one or more hardware processors configured by machine-readable instructions, and/or other components. The electronic storage may store an intent model, training information, a trained intent model trained to determine potential permitted intents from the predefined list of permitted intents, a predefined list of permitted intents, and/or other information. In some implementations, the intent model and the training information may be stored in a separate electronic storage. The trained intent model may be similar to the intent model but trained based on the training information. The training information may include transcripts of utterances that convey commands, entities identified in the transcripts, the predefined list of permitted intents, executed intents, and/or other information.

The machine-readable instructions may include one or more instruction components. The instruction components may include computer program components. The instruction components may include one or more of model obtaining component, model training component, information obtaining component, transcript generating component, language processing component, model utilizing component, context determining component, intent executing component, and/or other instruction components.

The model obtaining component may be configured to obtain the intent model. The model obtaining component may be configured to obtain the training information and/or other information.

The model training component may be configured to train the intent model to determine potential permitted intents from the predefined list of permitted intents that are included in the transcripts. The transcripts, the entities identified in the transcripts, the predefined list of permitted intents, and/or other training information may be used as training inputs. The executed intents and/or other training information may be used as the training outputs.

The information obtaining component may be configured to obtain audio information, captured by a client computing platform, that represents sounds conveying utterances in different contexts. The audio information may include first audio information, second audio information, and/or other audio information. The sounds represented by the first audio information may convey an utterance of a first command in a first context. The sounds represented by the second audio information may convey an utterance of a second command in a second context. The second command may be the same as the first command.

The transcript generating component may be configured to generate, by performing speech recognition on the audio information, a transcript representing the utterances. The transcripts may include transcript segments that convey individual ones of the utterances.

The language processing component may be configured to perform natural language processing on the transcript to determine sets of entities within the commands. As such, a set of entities within the first command and the second command may be determined.

The model utilizing component may be configured to provide the transcript and the set of entities to the trained intent model. The model utilizing component may be configured to obtain, from the trained intent model, a set of potential permitted intents from the predefined list of permitted intents that are prospective for the first command and the second command.

The context determining component may be configured to determine the different contexts during the utterances of the commands. As such, the first context may be determined during the utterance of the first command and the second context may be determined during the utterance of the second command. Individual ones of the different contexts may include a graphical user interface presented by the client computing platform, prior executed intents, previous ones of the transcript segments, and/or other contexts.

The intent executing component may be configured to determine, based on the different contexts, final intents for the commands. That is, a first final intent from the set of potential permitted intents may be determined for the first command based on the first context. Furthermore, a second final intent from the set of potential permitted intents is determined for the second command based on the second context. The intent executing component may be configured to execute the final intents such that the first final intent for the first command and the second final intent for the second command may be executed.

As such, a system that enables users, e.g., the caregiver, to naturally speak aloud or with other participants without manually performing actions related to relevant topics spoken about (e.g., appointments, medications) is provided. The system may eliminate requirements of existing systems to provide explicit commands in accordance with predefined syntax to cause final intents where the existing systems analyze the structure of the spoken command rather than substantial entities spoken, other information that is relevant, and/or the context during which the utterances and the commands are provided. As such, the system may increase speed and efficiency in intent effectuation and intent accuracy.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
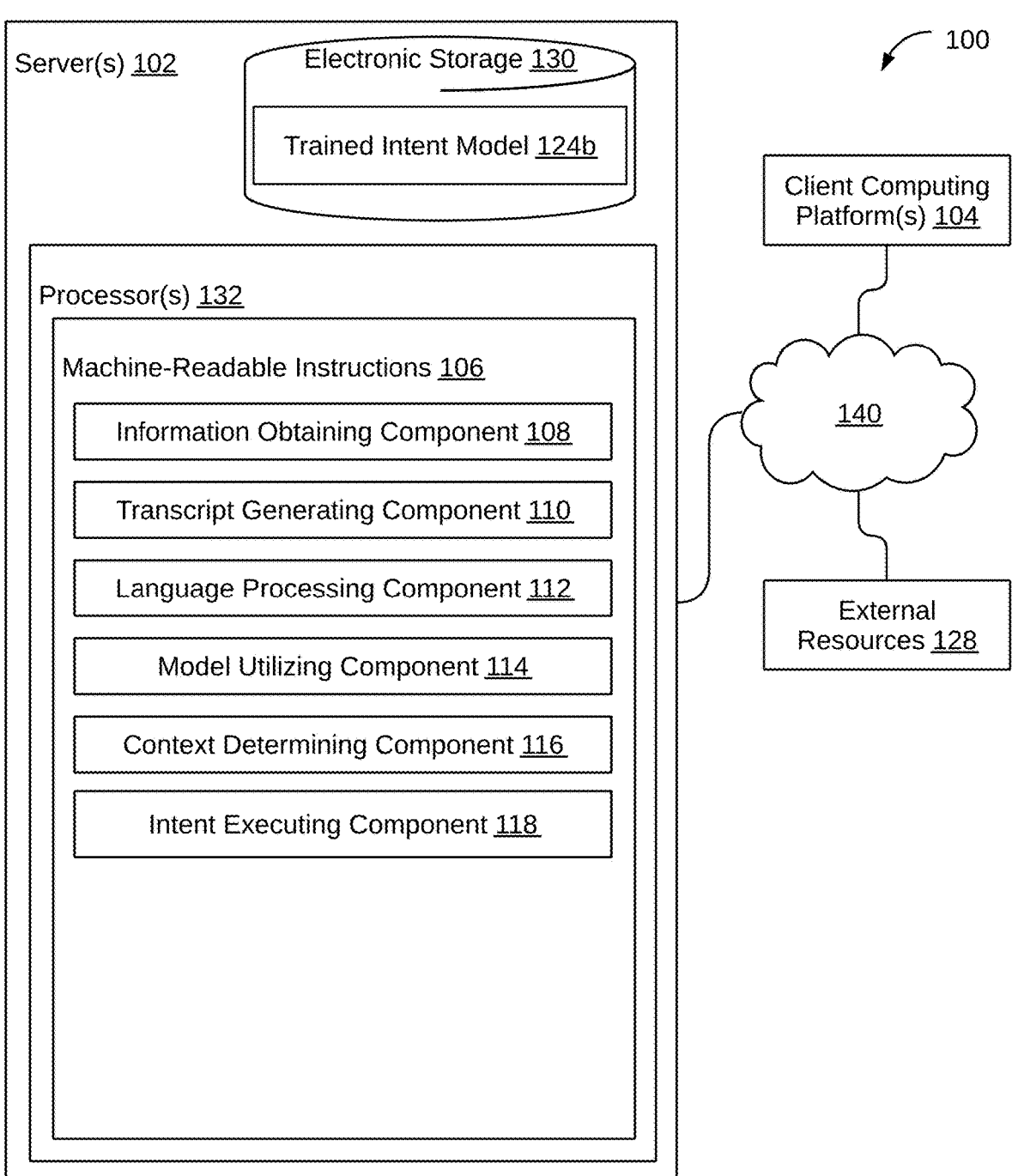
FIG. 1A-B illustrates a system configured to effectuate intents based on context during utterances of commands and permitted intents, in accordance with one or more implementations.
Figure 1B:
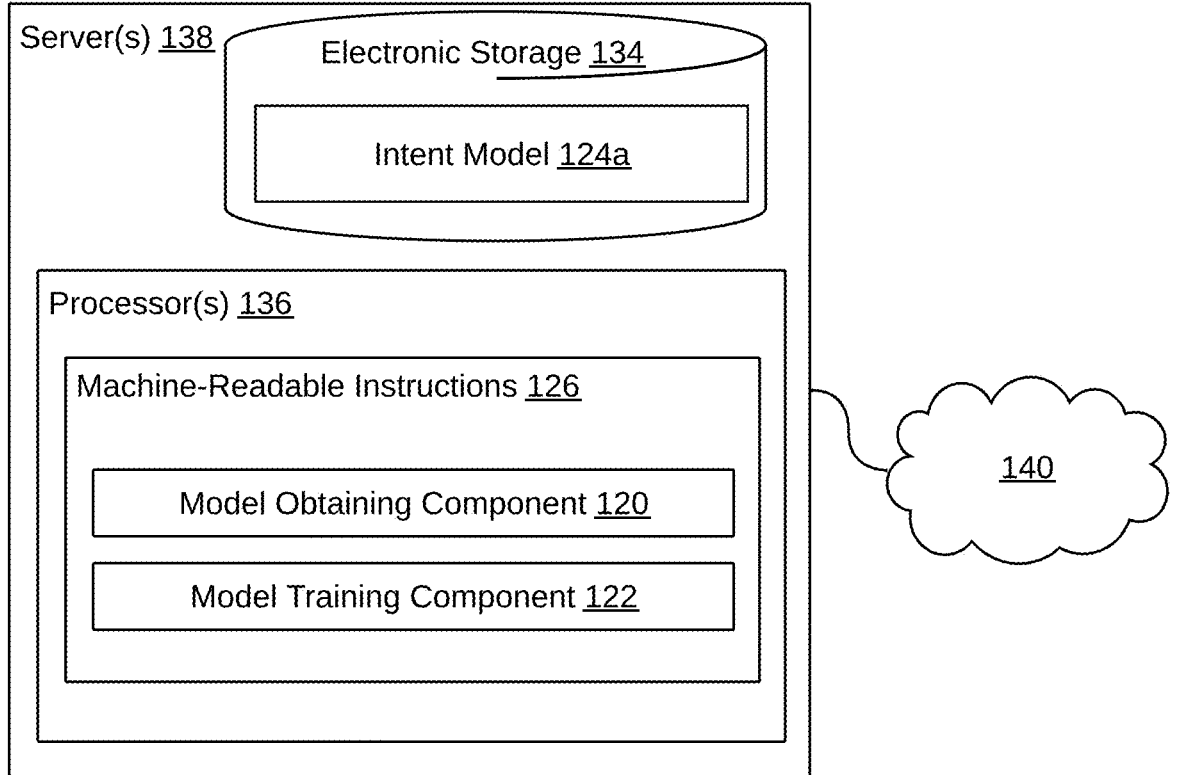

FIG. 1A-B illustrate a system 100 configured to train and utilize an intent model to determine final intents to effectuate based on context during utterances of commands and based on permitted intents, in accordance with one or more implementations. In some implementations, system 100 may include one or more servers 138 of FIG. 1B, electronic storage 134 of FIG. 1B, one or more servers 102 of FIG. 1A, electronic storage 130 of FIG. 1A, and/or other components. Server(s) 102 may be configured to communicate with one or more client computing platforms 104 via network 140 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Referring to FIG. 1B, electronic storage 134 may be similar to electronic storage 130 of FIG. 1A described herein, but included in server(s) 138. In some implementations, electronic storage 130 and electronic storage 134 may communicate via network 140 (the same as in FIG. 1A) or may be the same storage media, and thus store the same information.

Electronic storage 134 may store at least intent model 124a, training information, and/or other information. The training information may include (i) transcripts of utterances that convey commands, (ii) entities identified in the transcripts, (iii) predefined list of intents, (iv) executed intents, and/or other training information.

The transcripts included in the training information may be textualized representations of past conversation sessions between participants or otherwise utterances that are used to train intent model 124a. The participants in the individual past conversation sessions may include one or more caregivers, a subject, and/or other participants. The utterances may be uttered by the one or more caregivers, the subject, and/or the other participants. In some implementations, the caregivers may be professionals such as doctors, nurses, physician assistants, among others. In some implementations, the caregivers may include one or more parents, guardians, and/or other people that care for the subject.

The transcripts may include one or more transcript segments. Individual ones of the transcript segments may textually represent individual ones of the utterances that are provided by the individual participants. The individual transcript segments may be uttered by different ones of the participants. For example, a first transcript segment may be uttered by a first caregiver, a subsequent second transcript segment may be uttered by a subject, and a subsequent third transcript segment may be uttered by the first caregiver. The transcripts may convey and/or include commands, commands uttered in an informal unstructured manner, entities, and/or other information related to the subject uttered by one or more of the participants. The commands, structured and unstructured, may refer to one or more of the entities and/or actions to execute so that functionality is trigger and the executed intents result.

In some implementations, the commands may be naturally articulated as opposed to the commands being uttered in accordance with predefined commands. That is, the commands may be integrated amongst one or more of the utterances. In some implementations, the commands may be uttered in accordance with the predefined commands. The predefined commands may include structured utterances that cause particular intents. The predefined commands may be stored in electronic storage 130 of FIG. 1A, electronic storage 134 of FIG. 1B, and/or other storage.

The entities identified in the transcripts may be based on the entities spoken by the participants of which are represented in the transcripts. The entities spoken may be values for parameters or values that otherwise specify information related to or about the subject of which were uttered by one of the participants. Individual ones of the entities identified in the transcripts may indicate other ones of the entities in the transcripts that the individual entities are adjacent to, other ones of the entities that are included in the same transcript segment, other ones of the entities that are included in the transcript segment prior to or subsequent to the transcript segment that the individual entities are included in, the participant that uttered the individual entities, individual points at which the individual entities are identified relative to the length of the transcripts, and/or other information that indicates where in the transcripts that the individual entities identified are present.

In some implementations, the entities may be categorized into different entity classes. The entity classes may be different sets of related features and parameters that may be discussed during the conversation sessions or otherwise uttered, in some implementations, included in notes as they are being automatically populated. The notes may include medical notes, legal notes, mechanical notes, and/or notes specific to other knowledge domains. The entity classes and notes described herein may be related to the medical knowledge domain for exemplary purposes and is not intended to be limiting. The medical knowledge domain may refer to terms, phrases, entities, literature, transcripts, values, and/or other information that are related to medicine. However, other knowledge domains may be utilized additionally or alternatively such as education, auto mechanics, among others. By way of non-limiting example, the entity classes may include at least complaints, allergies, conditions, medications, procedures, medical devices, appointments, caregivers, and/or other entity classes. In some implementations, the entity classes stored may be modified by the users adding and/or removing one or more entity classes via client computing platforms 104.

The entities in the individual entity classes may include, for example, breathlessness, tiredness, fatigue, pain, fever, swelling, rashes for the complaints entity class. As another example, the entities for the allergies entity class may include tree nuts, soy, gluten, dairy, among other allergies. As another example, the entities for the conditions entity class may include Alzheimer's, arthritis, chickenpox, diabetes, pneumonia, tonsillitis The entities for the medications entity class may include Tylenol, Aleve, Atenolol, Tenormin, among other conditions. As another example, the entities for the procedures entity class may include appendectomy, cataract surgery, colectomy, knee replacement, among other procedures. As another example, the entities for the medical devices entity class may include crutch, pacemaker, pulse oximeter, ventilator, among other medical devices. As another example, the entities for the appointments entity class may include a follow-up, routine care, an urgent visit, an office visit, among other appointments. As another example, the entities for the caregivers entity class may include individual names of individual ones of the caregivers.

The predefined list of permitted intents may be intents that are permitted and attainable by system 100 in response to provocation by a caregiver or user of system 100. By way of non-limiting example, the intents may include selecting a note type to generate a note, modifying a note presented by client computing platform 104, placing a call to another caregiver or individual, transmitting information to one or more of the caregivers or departments, obtaining and display information for viewing, and/or other intents.

Modifying the note may include, but not limited to, deleting a word, deleting a sentence, deleting a section, emphasizing a word, emphasizing a sentence, emphasizing a section, adding information from stored electronic medical records (e.g., allergies, current prescriptions), and/or other modifications.

Transmitting the information to one or more of the caregivers or departments may include transmission via E-mail, a messaging portal, close range wireless communication, and/or other transmission techniques. The information transmitted may include, but not limited to, the note currently being modified or created upon completion, a portion of the individual electronic medical records (e.g., current medications, medical history), images (e.g., take by subject, X-rays), information conveyed in the utterances, one or more portions of the transcripts, and/or other information.

It is to be understood that the intents described herein are for exemplary purposes only and are not intended to be limiting as the functionalities described herein may be applied in various other fields. Electronic storage 130 in FIG. 1A and/or electronic storage 134 may store functions, code, or otherwise a specification corresponding with the intents that may be executed with the one or more entities identified and/or other information to attain the intents. The information obtained and displayed may include information stored by electronic storage 130, electronic storage 134, cloud-storage, external resources 128, and/or other information.

The executed intents may refer to final results or impacts that are in response to the commands. Individual ones of the executed intents may be one of the permitted intents from the predefined list of which were executed in accordance with one or more of the entities identified in the transcripts, other information conveyed in the transcripts, and/or other information. The executed intents may be executed subsequent to the commands included in the transcripts. Individual ones of the executed intents may be correlated with one or more of the entities identified in the transcripts and/or the other information included in the transcripts. Such correlations may indicate that the one or more entities affected the executed intents. In some implementations, the correlations may be included in the training information.

Server(s) 138 that may be configured by machine-readable instructions 126 of processor(s) 136. Machine-readable instructions 126 may include one or more instruction components. As described herein, server(s) 138 may be similar to server(s) 102 of FIG. 1A, machine-readable instructions 126 may be similar to machine-readable instructions 106 of FIG. 1A, and processor(s) 136 may be similar to processor(s) 132 of FIG. 1A, but executed by server(s) 138. The instruction components may include one or more of model obtaining component 120, model training component 122, and/or other instruction components. In some implementations, components 120 and/or 122 may be included as machine-readable instructions 106, therefore the functionality of all the components are executed by server(s) 102. In some implementations, components 108, 110, 112, 114, 116, and/or 118 may be included as machine-readable instructions 126, therefore the functionality of all the components are executed by server(s) 138.

Model obtaining component 120 may be configured to obtain the training information from electronic storage 134. Model obtaining component 120 may be configured to obtain intent model 124a from electronic storage 134. Intent model 124a may be trained to determine potential permitted intents, from the predefined list of permitted intents, that are anticipated by the individual transcripts based on at least the individual transcripts and sets of the entities identified in the individual transcripts that are input to trained intent model 124b. Trained intent model 124b may be the same as intent model 124a but subsequent to training as described. The potential permitted intents may be a subset of the permitted intents from the predefined list. One of the permitted intents in the subset may be the result that the participant anticipated and intended. The one permitted intent from the subset may be determined and effectuated based on context that the utterances were provided in.

Model training component 122 may be configured to train intent model 124a to determine the potential permitted intents by using the transcripts, the entities identified in the transcripts, the predefined list of permitted intents, and/or other training information as training inputs. In some implementations, the correlations may be used as the training inputs. Furthermore, the executed intents and/or other training information may be used as the training outputs. The training inputs and the training outputs may be information that are closely correlated. That is, for example, a reoccurring training input, e.g., a command conveyed in the transcripts and particular entities identified in the transcripts, may correspond to a training output that occurs often, e.g., a particular executed intent. Thus, such training input and training output may be closely correlated. As such, intent model 124a is trained to determine the potential permitted intents from the predefined list of permitted intents based on transcripts that include at least commands and convey the one or more entities.

Intent model 124a may be trained based on the training inputs, the training outputs, and/or other information by using known and/or novel machine learning techniques and/or other training techniques. Intent model 124a may include deterministic models, machine learning classifiers, and/or other machine learning techniques. In some implementations, intent model 124a may be continuously or periodically trained based on the training information as more of the training information is obtained and stored to electronic storage 134, and/or as model obtaining component 120 obtains access to other electronic storage. That is, while intent model 124a is not being employed (i.e., trained intent model 124b herein), intent model 124a may be continuously trained based on the training information and/ or other information. In some implementations, intent model 124a may be trained periodically every week, every month, or other period of time, or at a point in time that new training information is obtained or accessible.

Model training component 122 may be configured to store trained intent model 124b to electronic storage 134, electronic storage 130 of FIG. 1A, and/or other storage. In some implementations, electronic storage 130 and electronic storage 134 may be cloud-based storage and/or resources that processor(s) 132 of FIG. 1A and 136 of FIG. 1B, and instruction components thereof, may access via network 140. In some implementations, electronic storage 130 and electronic storage 134 may be native to server(s) 102 and 138, respectively, and additional cloud-based storage and/or resources may be utilized to store the information described herein in addition to electronic storage 130 and electronic storage 134. The additional cloud-based storage and/or resources may be accessed via network 140.

Referring to FIG. 1A, server(s) 102 may be configured by machine-readable instructions 106, may include electronic storage 130, and/or other elements. Electronic storage 130 may store the predefined list of permitted intents, a directory of accessible caregivers, a resource inventory, caregiver information for the caregivers, trained intent model 124b, electronic medical records for subjects, and/or other information.

The directory of accessible caregivers may include multiple caregivers that are accessible by other ones of the caregivers, the subjects, and/or other individuals. The directory may enable communications amongst the caregivers and/or with the subjects by including contact information, the caregiver information, and/or other information for the individual caregivers. The contact information may include one or more of a phone number, an office location, a department, an E-mail address, a mailing address, and/or other contact information. In some implementations, the directory may be limited to a location or office, a caregiver network, a department, and/or other directory limitations.

In some implementations, the resource inventory may be one of external resources 128 and thus accessible via network 140. The resource inventory may indicate whether individual items are available, how many of the items are available, unavailable, an amount of the items that are backordered, and/or status of future inventory. The status of the future inventory may indicate that a given item is not going to be available, an estimated time until the given item is available again, and/or other statuses. The items may include, by way of non-limiting example, medical devices, medications, supplies (e.g., bandage wrap), medical tools, vaccines, and/or other items.

The caregiver information for the caregivers may include a name, content indicating an academic transcript, content indicating an accolade list, content indicating training and work experience, content indicating one or more certifications, a schedule of appointments at locations, and/or other caregiver information. In some implementations, external resources 128 may indicate schedules for the individual caregivers, resource fulfillment information, and/or other information. The schedules may indicate dates and times when the caregivers are available and unavailable and/or the location information that indicates the locations of the appointments for the caregivers. The location information may include an address, a building, a floor, a room number, a department, an exam station, and/or other location information.

In some implementations, a subset of the permitted intents included in the predefined list may be related to specific locations and/or other specific information. By way of non-limiting example, a first permitted intent may provide directions from one location to another. As another example, a second permitted intent may request assistance or presence of another caregiver at the location of the caregiver.

That is, one of the entities from the set of entities may be a second caregiver such that the first command the caregiver uttered is related to the second caregiver. The first command may have been uttered with the intention of paging the second caregiver (e.g., a delivery nurse). The permitting intent of paging the second caregiver (e.g., a delivery nurse) may be based on the location information of the caregiver (e.g., an obstetrician) uttering the first command, the caregiver information for the caregiver indicating their specialty, the caregiver information for the second caregiver indicating their specialty, and the directory of caregivers which is based on the location information of the caregiver. As such, the directory may include the second caregiver and other caregivers for paging at the same location as the caregiver.

The resource fulfillment information may indicate whether ordered items are fulfilled. Ordered items may be items that are ordered for the subject. Fulfillment of the ordered items may indicate that the subject gained possession of the ordered items. In some implementations, the resource fulfillment information may include prescriptions, the medical devices (e.g., sleep apnea machine), supplies, and/or other items that were fulfilled. For example, in some implementations, the electronic medical records stored in electronic storage 130 may indicate the prescriptions that were fulfilled. In some implementations, external resources 128 may include a pharmaceutical database that records prescriptions available and fulfilled prescriptions may provide the resource fulfillment information.

Individual ones of the electronic medical records may include identifying information of the individual subjects, current medications, current allergies, current illnesses and conditions, test results, notes related to the individual subjects, and/or other information. In some implementations, the individual electronic medical records may include past procedures, past notes related to the individual subjects, past notes related to the past visits or the past procedures, past notes related to the test results, past medications, past allergies, past illnesses and conditions, and/or other past information about the individual subjects. By way of non-limiting example, electronic storage 130 may store an electronic medical record for the subject.

Machine-readable instructions 106 may include one or more instruction components. The instruction components may include computer program components. The instruction components may include one or more of information obtaining component 108, transcript generating component 110, language processing component 112, model utilizing component 114, context determining component 116, intent executing component 118, and/or other instruction components.

Information obtaining component 108 may be configured to obtain the audio information that represents sounds captured by client computing platforms 104. The sounds may convey utterances in different context. In some implementations, the utterances from the participants may be during individual conversation sessions, during scheduled visits, during note generating, and/or other circumstances. The participants in the individual conversation sessions may include the one or more caregivers, the subject, and/or other participants.

In some implementations, the audio information may be obtained in an ongoing manner. The term "ongoing manner", as used herein, may refer to continuing to perform an action (e.g., obtain) continuously or periodically (e.g., every 30 seconds, every minute, every hour, etc.) until receipt of an indication to terminate. That is, information obtaining component 108 may be continuously determining whether the audio input devices of client computing platform 104 are detecting any sounds from participants.

The audio information may include first audio information, second audio information, and/or other audio information. The sounds represented by the first audio information may convey an utterance of a first command in a first context. The sounds represented by the second audio information may convey an utterance of a second command in a second context. The second command may be the same as the first command.

In some implementations, the audio information may include digital audio signals that encode sounds of individual utterances of the participants, a recording of the individual utterances of the participants, and/or other audio information. In some implementations, the sounds conveying the utterances of the participants may be detected by the audio input device, such as a microphone, of client computing platform 104. In some implementations, the sounds may be converted to the digital audio signals by converting analog waves to the digital audio signals by precisely measuring the analog waves at consistent and frequent intervals. The recording of the individual utterances may include a digital file of a reproduction of the digital audio signals that cause the sounds, and thus convey the utterances, the digital audio signals, and/or other recording. In some implementations, information obtaining component 108 may be configured to generate the audio information based on the sounds in response to silence that follows individual ones of the utterances from the different participants, a change in the participant speaking detected, and/or user input via the user interface elements (e.g., selecting a virtual button). In some implementations, the silence may be for a particular amount of time that may be fixed or modifiable by the users. In some implementations, the audio information may be stored in electronic storage 130 in association with the subject.

Transcript generating component 110 may be configured to generate transcripts representing the utterances by performing speech recognition on the audio information. The transcripts may be generated by performing known and/or novel speech recognition techniques on the audio information. In some implementations, the generation of the individual transcripts may be in the ongoing manner. In some implementations, the audio information may include audio segments. The audio segments may convey the individual utterances or sets of utterances. Thus, information obtaining component 108 may be configured to generate transcript segments, that thus comprise the individual transcripts, based on the individual audio segments.

Language processing component 112 may be configured to perform natural language processing on the transcript to determine sets of the entities within the commands present in the transcripts. In some implementations, the natural language processing may be performed to determine the sets of the entities within the transcripts, the commands, and/or other information. The sets of entities determined may be relevant and related to the commands conveyed in the transcripts. As such, by way of non-limiting example, a set of entities within the first command and the second command may be determined.

In some implementations, determining the sets of entities and/or the commands may be determined based on the audio information that the transcripts represent. In some implementations, determining the one or more entities spoken and/or the commands may include employing known and/or novel natural language processing techniques based on phrases, semantics, syntax, and/or other text conveying natural language included in the transcripts. In some implementations, determining the set of entities and/or the commands may be based on the respective electronic medical records of the subjects, the directory of accessible caregivers, the resource inventory, the caregiver information for the caregivers, the location information, and/or other information stored and/or accessible by system 100. That is, in some implementations, the one or more entities in the set of entities may be relevant to the subjects as indicated by their electronic medical records, referring to particular ones of the caregivers, and/or referring to one or more of the items as indicated in the resource inventory. For example, the subject may have heart conditions and the electronic medical record the subject may indicate the heart conditions. Thus, determining the one or more entities in the transcript may contemplate the heart conditions and the caregivers in the directory that are cardiologists.

Model utilizing component 114 may be configured to provide the individual transcripts, the set of entities, and/or other information to trained intent model 124*b* as input. By way of non-limiting example, the transcript, the set of entities, and/or other information may be provided to trained intent model 124*b*. Model utilizing component 114 may be configured to obtain, from trained intent model 124*b*, sets of potential permitted intents from the predefined list of permitted intents that are prospective for the individual commands as its output. By way of non-limiting example, a set of potential permitted intents from the predefined list of permitted intents that are prospective for the first command and the second command may be obtained. As described, the potential permitted intents may be a subset of the permitted intents from the predefined list one of which may be the result that the participant intended via the individual commands.

Context determining component 116 may be configured to determine the different contexts during the utterances of the commands. By way of non-limiting example, a first context may be determined during the utterance of the first command and the second context may be determined during the utterance of the second command. Individual ones of the different contexts include a graphical user interface presented by client computing platform 104, prior ones of the executed intents, previous ones of the transcript segments, the caregiver information, the directory of the caregivers, the resource inventory, the electronic medical records, the location information for the individual caregivers and/or the subjects, and/or other context.

The graphical user interface presented by client computing platform 104 may include one or more text, a set of options, a set of user interface elements, and/or other graphical elements. The text may provide information related to the subject, the location of the caregiver, a note for the subject, the electronic medical record for the subject, and/or other information. In some implementations, the text may be provided by the caregiver via manual input or the utterances. In some implementations, the text may indicate that such text was the last modified or interacted with element presented by client computing platform 104. In some implementations, such indication may be visible to the caregiver via color highlight, bolding, underlining, italicizing, and/or other visual indications.

The set of options may be presented in response to user input, whether manual or voice. The set of options may provide alternatives for an element where one or more of the options may be selected. By way of non-limiting example, the set of options may be for selecting a note type for the note, selecting a medication with a particular active ingredient, selecting one or more of the caregivers from the directory of the caregivers to contact, selecting one or more the items indicated by the resource inventory, and/or other elements. In some implementations, the set of options may be presented as a set of user interface elements.

An individual user interface element may be configured to be selected by or manipulated by the caregivers or other users. The user interface elements may be configured to facilitate user interaction with the user interface, user entry, and/or selection. By way of non-limiting illustration, the user interface elements may include one or more of text input fields, virtual drop down menus, virtual check boxes, virtual display windows, virtual buttons, and/or other user interface elements.

The prior ones of the executed intents may be the executed intents that occurred prior to determining a given final intent from the set of potential permitted intents. The prior executed intents may be related to the final intents that are presently being determined from the set of potential permitted intents and thus provide insight or context.

The previous ones of the transcript segments may be one or more of the transcript segments that were generated prior to the transcript segments that convey the first command and the second command. The previous transcript segments may include entities that are related to the transcripts segments that convey the first command and the second command or otherwise be related to the first command and the second command.

In some implementations, determining the different contexts may include determining the location information of client computing platform 104 associated with the caregiver. In some implementations, determining the different contexts may include determining the location information of other ones of the participants including determining IP addresses of their client computing platform 104, mailing addresses, billing addresses, and/or obtaining the location information from the participants. In some implementations, determining the different contexts may be based on the set of entities and the electronic medical record of the subject such that relevant portions of the electronic medical record may be identified based on the set of entities, and thus utilized as the context.

Intent executing component 118 may be configured to determine, based on the different contexts, final intents for the commands from the sets of potential permitted intents. The different contexts during which the different utterances and the different commands were provided may provide insight to which of the potential permitted intents is the final intent that is to be executed. Determining the final intents may include choosing one of the potential permitted intents from the sets based on the respective context that the commands were uttered in. By way of non-limiting example, a first final intent from the set of potential permitted intents based on the first context for the first command may be determined, and a second final intent from the set of potential permitted intents based on the second context for the second command may be determined.

Intent executing component 118 may be configured to execute the final intents. Executing the final intents may include effectuating the code, the functions, or otherwise the specifications stored that may cause the final intent to occur. The final intents may be executed subsequent to determination of the final intents and within the context that the commands were provided. That is, the final intents may be executed closely after utterance of the commands. By way of non-limiting example, the first final intent for the first command may be executed in the first context, and the second final intent for the second command may be executed in the second context.

Figure 3A:
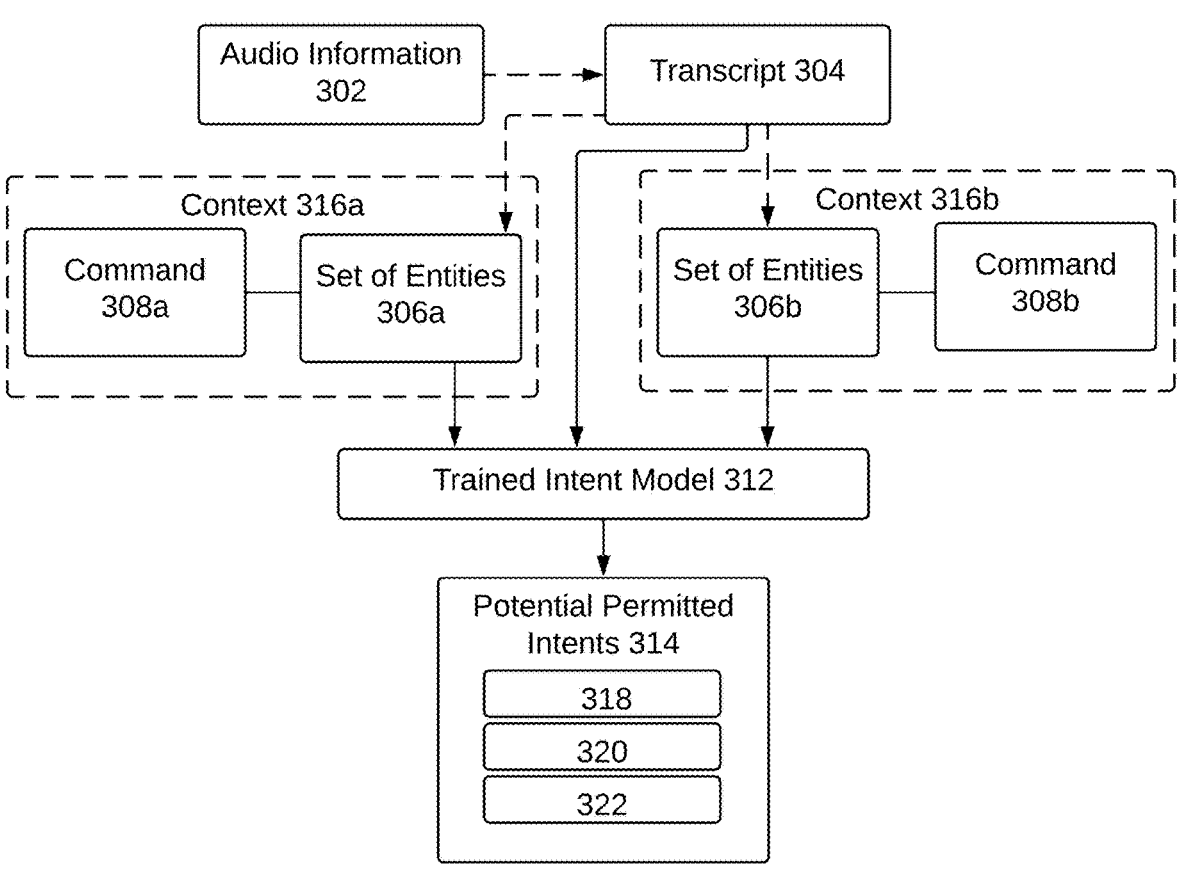
FIG. 3A-C illustrates an example implementation the system configured to effectuate intents based on context during utterances of commands and permitted intents, in accordance with one or more implementations.

FIG. 3A illustrates obtained audio information 302 that represents sounds that convey utterances from participants (not illustrated) in different contexts. The utterances may include a command 308a uttered in a context 316a, and a command 308b uttered in a context 316b. Commands 308a and 308b may be uttered by a caregiver 350a (illustrated in FIG. 3B). Transcript 304 may be generated based on audio information 302 to textually represent the utterances. A set of entities 306a related to command 308a and a set of entities 306b related to command 308b may be determined within transcript 304. Command 308a and command 308b may be the same. Thus, set of entities 306a and set of entities 306b may be the same.

Transcript 304, set of entities 306a, and set of entities 306b may be provided to trained intent model 312 as input. Trained intent model 312 may be trained to determine and output a set of potential permitted intents 314 from a predefined list of permitted intents (not illustrated). Set of potential permitted intents 314 output may be the same for both sets of entities 306a and 306b, and thus commands 308a and 308b. Set of potential permitted intents 314 may include permitted intent 318, 320, and 322.

Figure 3B:
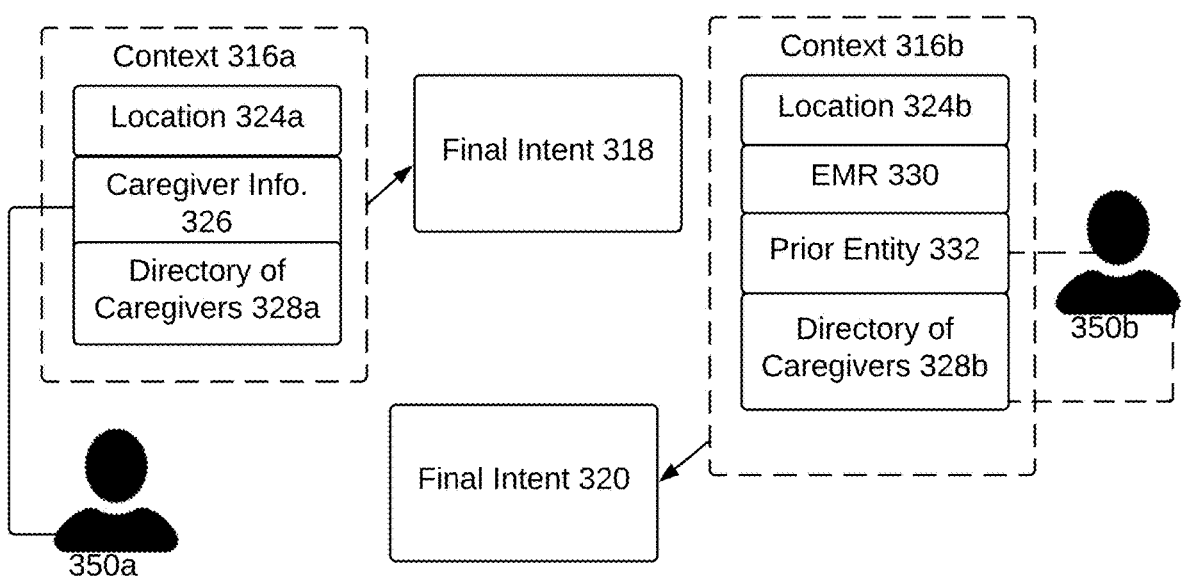
Figure 3C:
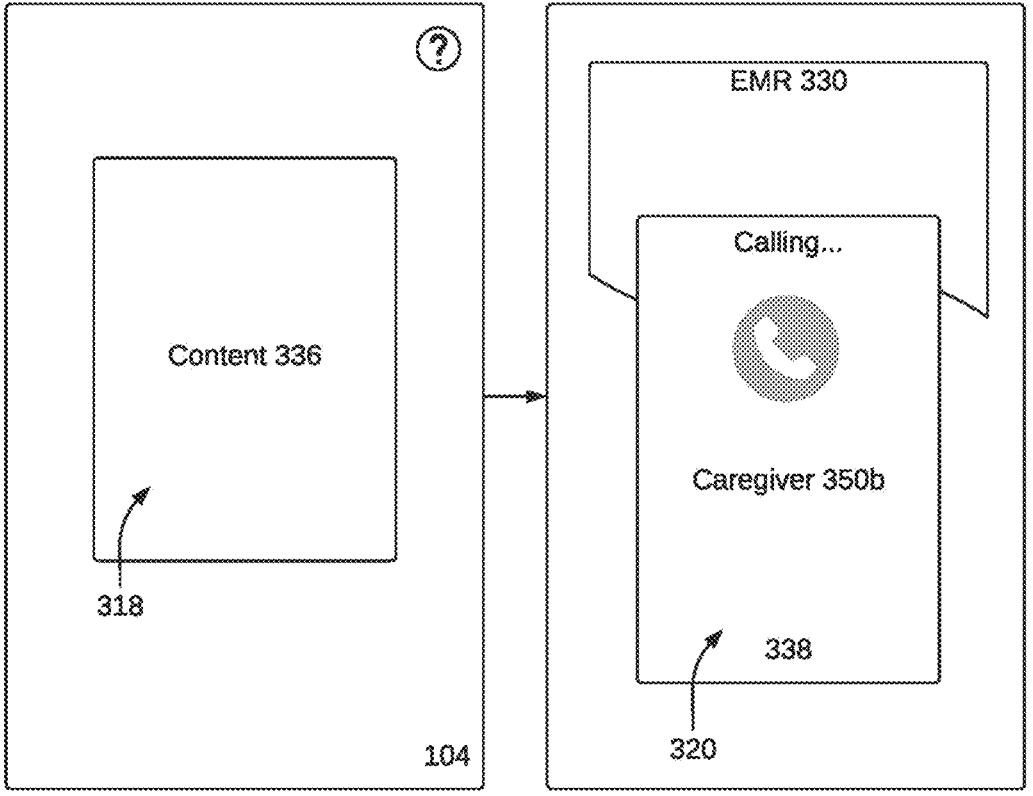

FIG. 3B may illustrate context 316a and context 316b of FIG. 3A that differ. Context 316a that command 308a was uttered in may include location 324a (e.g., an office lobby), caregiver information 326 (e.g., a name and credentials) of caregiver 350a, and directory of caregivers 328a. Directory of caregivers 328a may be specific to location 324a such that directory of caregivers 328a may, for example, includes the caregivers that are scheduled to be present at location 324a. Context 316b that command 308b was uttered in may include location 324b that is different than location 324a, an electronic medical record (EMR) 330 of a subject (not illustrated), a directory of caregivers 328b, and a prior entity 332. Location 324b may be, for example, an exam room that the subject is meeting caregiver 350a in. EMR 330 may specify that the subject has a particular health condition. EMR 330 may be presented and actively viewed by caregiver 350a (as illustrated in FIG. 3C) while command 308b is uttered. Prior entity 332 may be an entity conveyed in transcript 304 of FIG. 3A that specifies a caregiver 350b such that caregiver 350a referred to caregiver 350b via the utterances. Directory of caregivers 328b may include a set of the caregivers included in directory of caregivers 328a related to, for example, the credentials of caregiver 350a and the particular health condition of the subject.

Based on context 316a, a final intent 318 from set of potential permitted intents 314 may be determined for command 308a (of FIG. 3A). Furthermore, based on context 316*b*, a final intent 320 from set of potential permitted intents 314 may be determined for command 308*b* (of FIG. 3A).

FIG. 3C may illustrate a client computing platform 104 associated with caregiver 350*a* of FIG. 3B. Location 324*a* (of FIG. 3B) may be where client computing platform 104 was located during provision of command 308*a* (of FIG. 3A). Final intent 318 that is based on context 316*a* (of FIG. 3B) may be presentation of content 336 (e.g., a map of the office and directions to the exam room) via client computing platform 104. Client computing platform 104 may subsequently present EMR 330 (of FIG. 3B) during the meeting with the subject, for example. Final intent 320 that is based on context 316*b* (of FIG. 3B) may be contacting caregiver 350*b*.

Referring back to FIG. 1, in some implementations, server(s) 102, client computing platform(s) 104, and/or external resources 128 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, and/or 122, and/or other components. Processor(s) 132 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 132 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 132 may be configured to execute one or more additional components that may perform some or all of the functionality attributed below to one of components 108, 110, 112, 114, 116, 118, 120, and/or 122.

Figure 2:
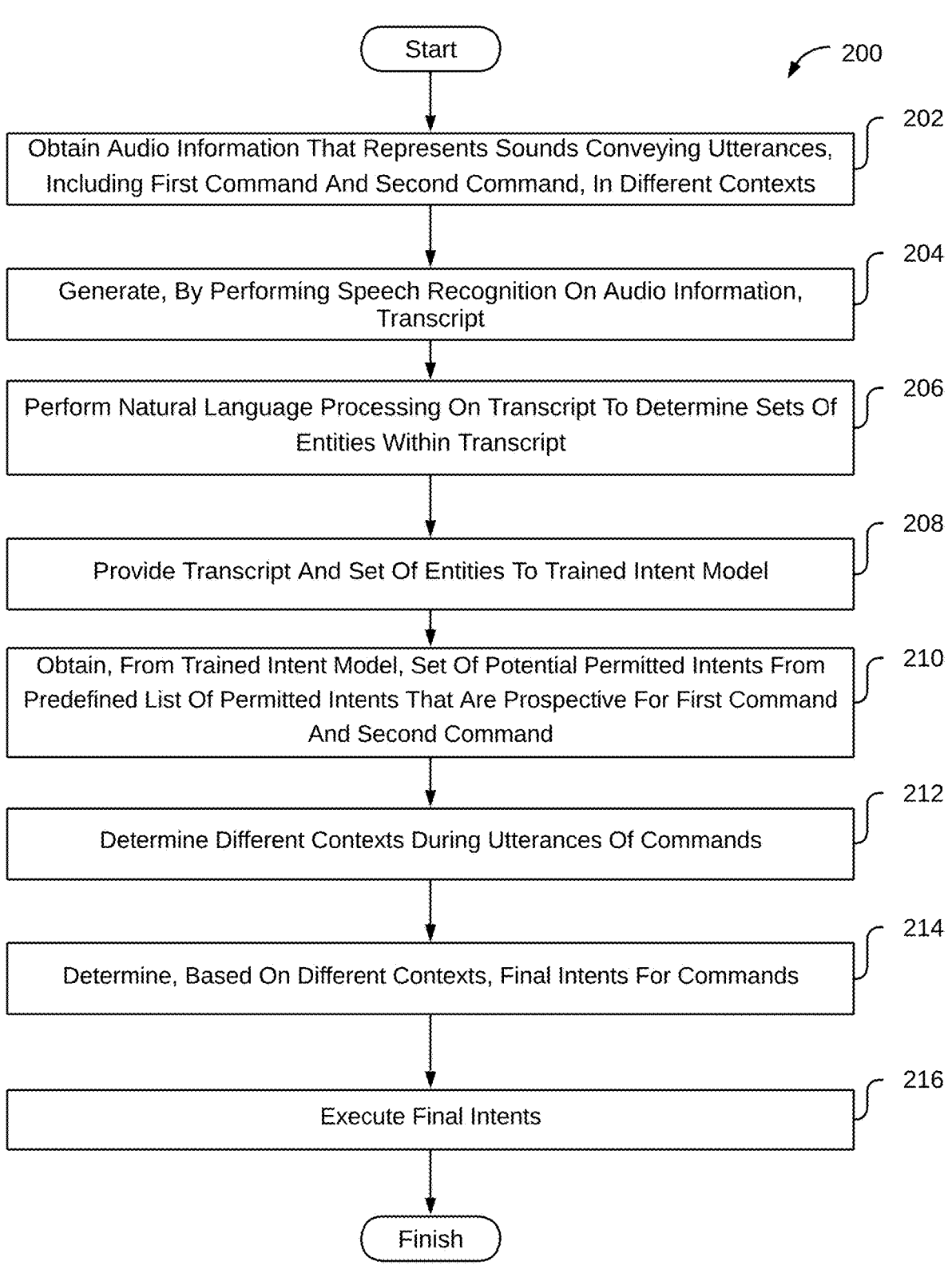
FIG. 2 illustrates a method to effectuate intents based on context during utterances of commands and permitted intents, in accordance with one or more implementations.

FIG. 2 illustrates a method 200 to effectuate intents based on context during utterances of commands and permitted intents, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining audio information that represents sounds captured by a client computing platform. The sounds convey utterances in different contexts including an utterance of a first command in a first context and an utterance of a second command in a second context. Operation 202 may be performed by one or more hardware processors configured by machine-readable instructions including a component that is the same as or similar to information obtaining component 108, in accordance with one or more implementations.

An operation 204 may include generating, by performing speech recognition on the audio information, a transcript. Operation 204 may be performed by one or more hardware processors configured by machine-readable instructions including a component that is the same as or similar to transcript generating component 110, in accordance with one or more implementations.

An operation 206 may include performing natural language processing on the transcript to determine sets of entities within the transcript. As such, a set of entities within the first command and the second command may be determined. Operation 206 may be performed by one or more hardware processors configured by machine-readable instructions including a component that is the same as or similar to language processing component 112, in accordance with one or more implementations.

An operation 208 may include providing the transcript and the set of entities to the trained intent model. Operation 208 may be performed by one or more hardware processors configured by machine-readable instructions including a component that is the same as or similar to model utilizing component 114, in accordance with one or more implementations.

An operation 210 may include obtaining, from the trained intent model, a set of potential permitted intents from the predefined list of permitted intents that are prospective for the first command and the second command. Operation 210 may be performed by one or more hardware processors configured by machine-readable instructions including a component that is the same as or similar to model utilizing component 114, in accordance with one or more implementations.

An operation 212 may include determining the different contexts during the utterances of the commands such that the first context is determined during the utterance of the first command and the second context is determined during the utterance of the second command. Operation 212 may be performed by one or more hardware processors configured by machine-readable instructions including a component that is the same as or similar to context determining component 116, in accordance with one or more implementations.

An operation 214 may include determining, based on the different contexts, final intents for the commands by determining a first final intent for the first command from the set of potential permitted intents based on the first context, and a second final intent from the set of potential permitted intents for the second command based on the second context. Operation 214 may be performed by one or more hardware processors configured by machine-readable instructions including a component that is the same as or similar to one intent executing component 118, in accordance with one or more implementations.

An operation 216 may include executing the final intents such that the first final intent for the first command and the second final intent for the second command are executed. Operation 216 may be performed by one or more hardware processors configured by machine-readable instructions including a component that is the same as or similar to intent executing component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to effectuate intents based on context during utterances of commands and permitted intents, the system comprising:

electronic storage that stores a predefined list of permitted intents; and one or more processors configured by machine-readable instructions to:

obtain audio information, captured by a client computing platform, that represents sounds conveying utterances of commands in different contexts, wherein the audio information includes first audio information and second audio information, wherein the sounds represented by the first audio information convey an utterance of a first command in a first context, and wherein the sounds represented by the second audio information convey an utterance of a second command in a second context, wherein the second command is the same as the first command;

generate, by performing speech recognition on the audio information, a transcript, wherein the transcript includes transcript segments that convey individual ones of the utterances;

perform natural language processing on the transcript to determine sets of entities within the commands such that a set of entities within the first command and the second command is determined;

provide the transcript and the set of entities to a trained intent model;

obtain, from the trained intent model, a set of potential permitted intents from the predefined list of permitted intents that are prospective for the first command and the second command;

determine the different contexts during the utterances of the commands such that the first context is determined during the utterance of the first command and the second context is determined during the utterance of the second command, wherein individual ones of the different contexts include one or more of a graphical user interface presented by the client computing platform, prior executed intents, or previous ones of the transcript segments;

determine, based on the different contexts, final intents for the commands, including determining a first final intent from the set of potential permitted intents based on the first context for the first command, and a second final intent from the set of potential permitted intents based on the second context for the second command; and execute the final intents such that the first final intent for the first command and the second final intent for the second command are executed.

2. The system of claim 1, wherein a subset of permitted intents included in the predefined list of permitted intents is related to specific locations, and wherein determining the different contexts includes determining location information of the client computing platform, wherein the client computing platform is associated with a caregiver providing one or more of the utterances, wherein determining the final intents is based on the location information.

3. The system of claim 2, wherein the electronic storage stores one or more of a directory of accessible caregivers, a resource inventory, caregiver information for the caregivers, or an electronic medical record for a subject.

4. The system of claim 3, wherein one or more of the utterances are uttered by the caregiver, wherein one of the entities from the set of entities is a second caregiver, wherein determining the different contexts is based on the directory of accessible caregivers and the caregiver information for the caregiver and the second caregiver.

5. The system of claim 1, wherein the graphical user interface includes one or more of text, a set of options, or a set of user interface elements.

6. The system of claim 3, wherein the set of entities includes one or more of a second caregiver, a value for a parameter, a medication, or an allergy.

7. The system of claim 6, wherein determining the different contexts is based on the set of entities and the electronic medical record of the subject.

8. A method to effectuate intents based on context during utterances of commands and permitted intents, the method comprising:

obtaining audio information, captured by a client computing platform, that represents sounds conveying utterances of commands in different contexts, wherein the audio information includes first audio information and second audio information, wherein the sounds represented by the first audio information convey an utterance of a first command in a first context, and wherein the sounds represented by the second audio information convey an utterance of a second command in a second context, wherein the second command is the same as the first command;

generating, by performing speech recognition on the audio information, a transcript, wherein the transcript includes transcript segments that convey individual ones of the utterances;

performing natural language processing on the transcript to determine sets of entities within the commands such that a set of entities within the first command and the second command is determined;

providing the transcript and the set of entities to a trained intent model;

obtaining, from the trained intent model, a set of potential permitted intents from a predefined list of permitted intents that are prospective for the first command and the second command;

determining the different contexts during the utterances of the commands, including determining the first context during the utterance of the first command and the second context during the utterance of the second command, wherein individual ones of the different contexts include one or more of a graphical user interface presented by the client computing platform, prior executed intents, or previous ones of the transcript segments;

determining, based on the different contexts, final intents for the commands, including determining a first final intent from the set of potential permitted intents based on the first context for the first command, and a second final intent from the set of potential permitted intents based on the second context for the second command; and executing the final intents, including executing the first final intent for the first command and the second final intent for the second command.

9. The method of claim 8, wherein a subset of permitted intents included in the predefined list of permitted intents is related to specific locations, and wherein the determining of the different contexts includes determining location information of the client computing platform, wherein the client computing platform is associated with a caregiver providing one or more of the utterances, wherein determining the final intents is based on the location information.

10. The method of claim 9, wherein the electronic storage stores one or more of a directory of accessible caregivers, a resource inventory, caregiver information for the caregivers, or an electronic medical record for a subject.

11. The method of claim 10, wherein one or more of the utterances are uttered by the caregiver, wherein one of the entities from the set of entities is a second caregiver, wherein the determining of the different contexts is based on the directory of accessible caregivers and the caregiver information for the caregiver and the second caregiver.

12. The method of claim 8, wherein the graphical user interface includes one or more of text, a set of options, or a set of user interface elements.

13. The method of claim 10, wherein the set of entities includes one or more of a second caregiver, a value for a parameter, a medication, or an allergy.

14. The method of claim 13, wherein the determining of the different contexts is based on the set of entities and the electronic medical record of the subject.

* * * * *